Figure 4:
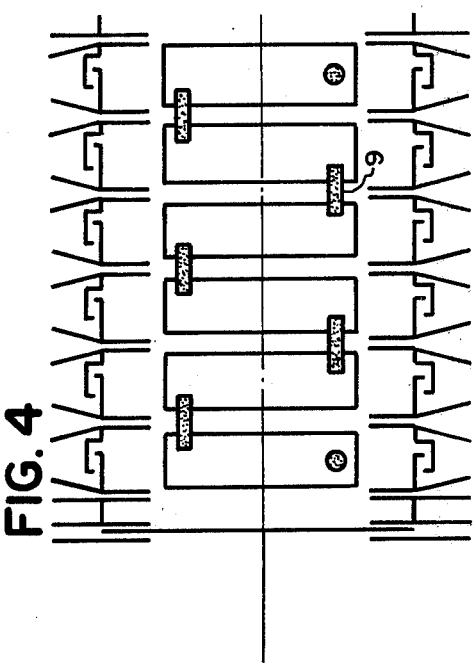
Figure 3:
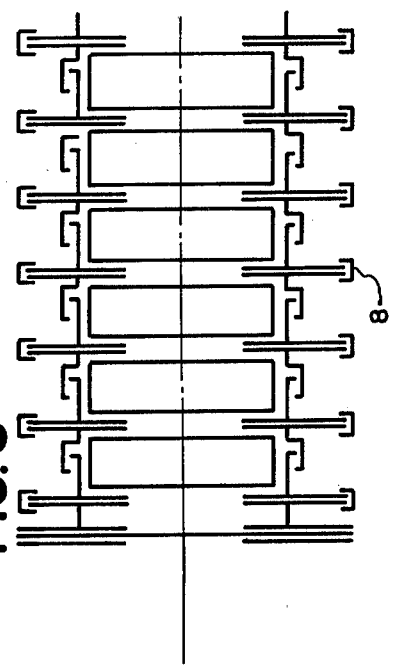

United States Patent [19]

Golz et al.

[11] 4,361,316

[45] Nov. 30, 1982

[54] PLATE STACK CLAMPING APPARATUS FOR STORAGE BATTERY MANUFACTURE

[75] Inventors: Hans-Joachim Golz, Hanover; Joachim Illmann, Garbsen, both of Fed. Rep. of Germany

[73] Assignee: Varta Batterie Aktiengesellschaft, Hanover, Fed. Rep. of Germany

[21] Appl. No.: 245,587

[22] Filed: Mar. 19, 1981

Related U.S. Application Data

[63] Continuation of Ser. No. 29,448, Apr. 12, 1979, abandoned.

[30] Foreign Application Priority Data

Jun. 8, 1978 [DE] Fed. Rep. of Germany ....... 2825093

[51] Int. Cl.$^3$ .......................... B25B 1/20; B25B 5/02; B25B 5/14
[52] U.S. Cl. ...................... 269/43; 269/238; 269/234; 29/730
[58] Field of Search ................ 29/730, 623.1, 281.3; 269/43, 42, 216, 234, 241, 254 R, 254 CS, 237, 238, 25

[56] References Cited

U.S. PATENT DOCUMENTS

| | | | |
|---|---|---|---|
| 1,081,071 | 12/1913 | Westland | 269/43 |
| 2,291,255 | 7/1942 | Powell | 269/254 |
| 2,516,965 | 8/1950 | Dresser | 269/254 CS |
| 2,591,805 | 4/1952 | Gossett | 24/255 R |
| 2,662,433 | 12/1953 | Braun | 269/241 |
| 3,294,258 | 12/1966 | Sabatino et al. | 29/730 |
| 3,312,460 | 4/1967 | Kaufman | 269/43 |
| 3,875,643 | 4/1975 | Cramer | 29/252 |
| 3,920,235 | 11/1975 | Hermanns | 269/234 |
| 4,065,116 | 12/1977 | Lindenberg et al. | 29/730 |
| 4,074,422 | 2/1978 | Borjesson et al. | 29/730 |
| 4,129,093 | 12/1978 | Johnson | 269/43 |
| 4,150,477 | 4/1979 | Orr | 29/238 |
| 4,208,045 | 6/1980 | Rowe et al. | 269/241 |

FOREIGN PATENT DOCUMENTS 735392  5/1980  U.S.S.R. ............................ 269/43

Primary Examiner—Daniel C. Crane
Attorney, Agent, or Firm—Weiser, Stapler & Spivak

[57] ABSTRACT

The plate stacks are positioned for further processing in a clamping arrangement with clamping elements between stacks. Each element is displaceable by an amount of play X with respect to its neighboring element.

8 Claims, 10 Drawing Figures

PLATE STACK CLAMPING APPARATUS FOR STORAGE BATTERY MANUFACTURE

This is a continuation of application Ser. No. 029,448, filed Apr. 12, 1979 now abandoned.

The invention relates to apparatus for receiving, positioning, and holding plate stacks for lead storage batteries, which includes a cassette conforming to the dimensions of the block casing and having clamping elements constituting the cell separating partitions.

In the manufacture of batteries it is customary to assemble six plate stacks, each of which consists when finished of positive and negative electrodes with intervening separators, united into a plate assembly while leaving narrow interstices free. To prevent needless rejects, they are further processed outside the block casing, pending ultimate insertion therein.

For example, pole bridges must be attached to the plate vanes of the electrodes, and cell connectors must be cast or welded onto these. This presupposes that all of the plate stacks have already been positioned relative to each other in the manner which corresponds to their later built-in state within the block casing. The interstices between the plate stacks must also be so dimensioned that they are later precisely filled by the cell separating partitions.

For the reception and prepositioning of the plate stacks during their terminal operations, apparatus is already known by which the entire block assembly is firmly held together by means of clamping elements which extend from the side into the interstices between the plate stacks and which position them conveniently for the manufacturing tools.

In general such apparatus takes the form of cassettes which conform to the plan dimensions of the block casing. Such a cassette with pneumatically acting clamping elements is described in German Patent Publication (Offenlegungsschrift) No. 2,554,069, and U.S. Pat. No. 4,065,116. However, clamping of the plate stacks can also be done by means of mechanical clamping elements, which may act, for example, by spring forces.

A disadvantage of such known apparatus is that the individual clamping elements form rigid walls, with unadjustable spacings between each other. This makes it difficult to insert the plate stacks into the open spaces, whose width corresponds only just to that of the cells of the block casing. Moreover, for plate block groupings whose plate stacks exhibit significant variations in thickness, those with lesser thickness are not firmly clamped.

Accordingly, it is an object of the present invention to provide apparatus for clamping plate stacks, which not only enables convenient introduction of the stacks between the clamping elements, but also ensures firm fixation for each stack even when there are wide thickness tolerances.

This and other objects which will appear are achieved in accordance with the invention by providing clamping elements which are displaceable relative to each other, so that their minimum spacings corresponding to the cell sub-divisions are extendable by an amount of "play" X.

Basically the invention is embodied in a telescoping cassette.

Figure 5:
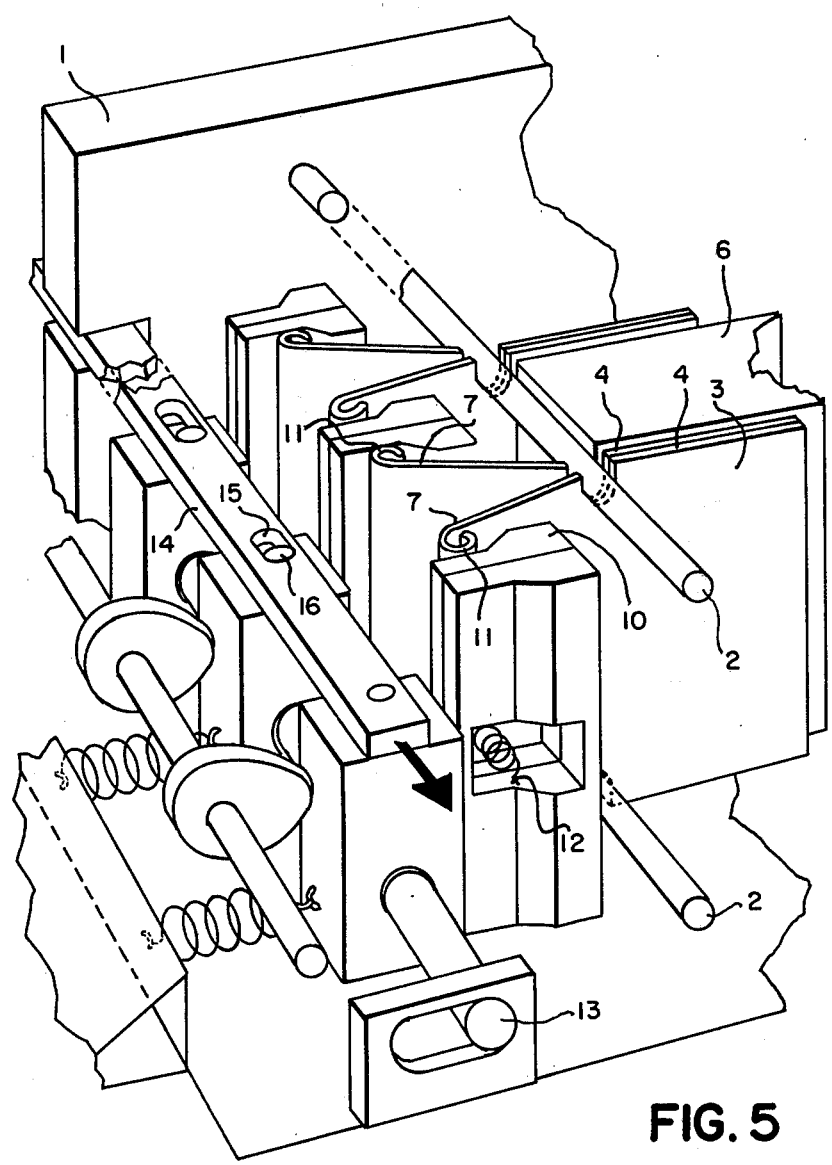

For further details reference is made to the discussion which follows, in light of the accompanying drawings wherein FIGS. 1, 2, 3 and 4 are diagrammatic illustrations of an embodiment of the invention at several different stages of its utilization;

FIG. 5 is a three-dimensional representation of a fragment of such an embodiment; and FIGS. 6 to 10 show, again diagrammatically, several different methods of providing the desired amount of play in the cassettes embodying the invention.

Figure 1:
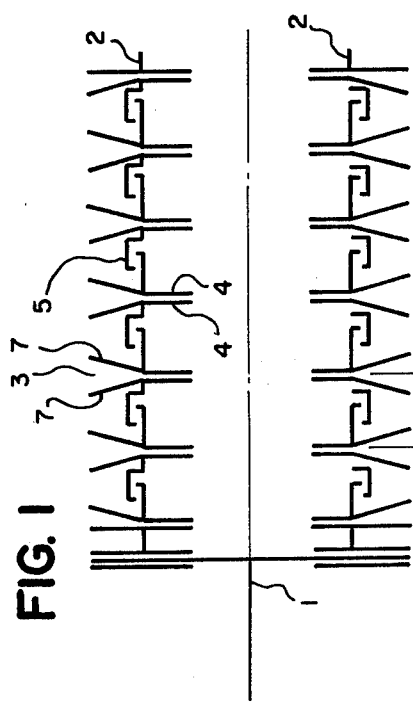

Referring to FIG. 1, this diagrammatically illustrates the cassette in its closed, i.e. pushed-together initial condition. It consists of a support member 1 to which are attached two arms 2 positioned parallel to each other. These arms carry slideable clamping elements 3.

It is particularly advantageous to use clamping elements each of which consists of two closely adjacent preformed simple leaf-springs 4. However, there can also be used pneumatic clamping elements such as are disclosed in the above-mentioned German Patent Publication and U.S. Patent, or wedge shaped clamping elements such as are know, for example, from German Pat. No. 2,022,163.

The slideability in the longitudinal direction of arms 2 is made possible by extension elements 5. These represent here diagrammatically a complete telescoping mechanism, several possible embodiments of which will be described later.

Figure 2:
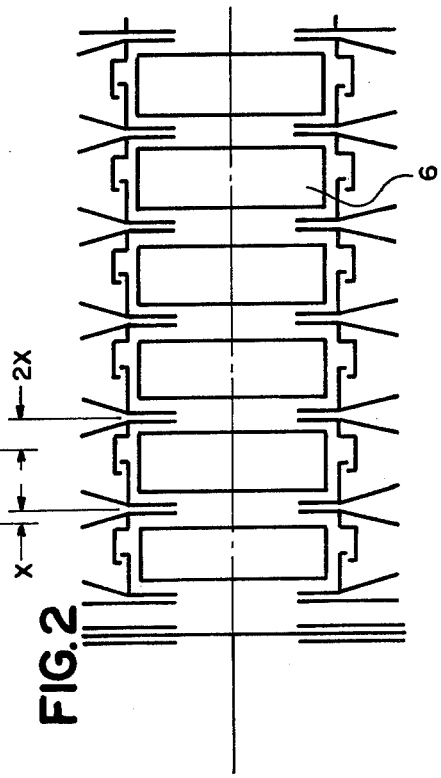

FIG. 2 shows the cassette in the extended, i.e. the open state. There the distance between clamping elements is increased by a predetermined amount X of "play". This corresponds to an enlargement of the corresponding internal cell dimensions within the block casing by the same amount. In this state, the cassette can have the plate stacks 6 conveniently introduced into it.

In FIG. 3, the cassette is again pushed together. The clamping elements are simultaneously placed under tension by squeezing together the spring leaves 7 which extend out of the cassette and locking them by means of restraint 8. In this state, there is carried out the casting-on of the pole bridges and cell connectors 9.

In FIG. 4, the clamping elements are again unclamped and the cassette is pulled open transversely to the long sides of the finished plate block assembly. The latter can therefore be readily lowered into the block casing positioned beneath.

After sliding together in the above-mentioned transverse direction, and renewed pulling apart parallel to the guide arms 2, the cassette is ready for reception of another plate stack.

In these schematic representations, the fixed point of the telescoping cassette is located at the left end. It is equally possible to move this fixed point to the middle portion of the cassette.

FIG. 5 shows the invention in a three-dimensional, representation, including clamping elements 3 formed of leaf springs 4 together with their actuating mechanism.

The leaf springs are made of spring steel and are between about 0.4 and 2 millimeters thick, preferably about 1 millimeter. Due to their elasticity, there takes place large area contact with the plate stack 6. Their particular advantage, however, resides in that they are close together even in their clamped state and do not occupy more than the thickness of the leaf spring material of which they are made.

Corresponding to the diagrammatic representation of FIG. 1, the clamping element 1 in FIG. 5 is in its unclamped state. To actuate it, there is provided a wedge shaped element 10 which is slidable between the spring leaves 7 of any two adjacent clamping elements 3. Good contact and good guidance of this wedge-shaped element 10 is assured, on the one hand, by the fact that the ends of the spring leaves outwardly terminate in loops 11 and, on the other hand, by the fact that helical springs 12 connect the corresponding spring leaves 7 with each other, passing through the wedge-shaped element 10 which is positioned between them.

The helical springs 12 simultaneously impart to the clamping elements the restoring force which is necessary for unclamping. The wedge-shaped elements 10 are provided with an aperture for the passage for the helical springs 12.

Clamping is then produced by the sliding of the wedge-shaped elements 10 against loops 11, which are pressed tightly together in response to such movement at right angles to the plate block assembly. In the process, spring leaves 4 mold themselves with large area contact and firmly against plate stacks 6. The clamping element is simultaneously latched in this position of the wedge-shaped elements 10, which corresponds to diagrammatic FIG. 2, whereas, in the position of the wedges shown in FIG. 5, it is unlatched. In this way, the clamping pressure created by the wedged shaped elements 10 adds to that produced by the sliding together of the cassette.

The wedge-shaped elements 10, which are all attached to an arm 13, slide during their forward and backward movement just above the floor of the cassette. As shown in FIG. 5, the movement can be transmitted, for example, by means of a cam shaft in conjunction with restoring springs. A gear-rack mechanism may also be used.

For attachment and positioning of the clamping elements, parallel extending guide rods 2 are firmly attached to the support member 1 of the cassette, which, in turn, is displaceable transversely to their longitudinal direction. The clamping elements can be displaced along these guide rods. The guide rods may also be replaced by one or more rail-shaped beams.

For the telescoping and pushing together of the clamping elements in accordance with the invention, there is also needed a drive in the opening as well as in the closing direction of the cassette. In addition, the telescoping must be limited. In the telescoping cassette according to the invention, these required functions are combined in a complex extending mechanism. If desired, various functional elements form part of this extending mechanism.

In FIGS. 6 to 10, various possible ways of telescoping the cassette are illustrated. In each instance, the upper sketch shows the cassette in its pulled-apart state, and the lower sketch shown, the pushed-together cassette.

Figure 6:
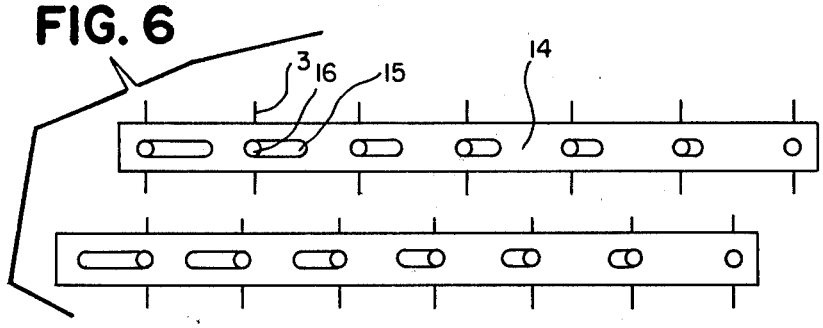

Thus, FIG. 6 contemplates using a slotted bar 14, whose apertures 15 are equally spaced at one of their ends, while the aperture diameter varies monotonically in the displacement direction by the amount of play X. The clamping elements 3 attached to pins 16 are correspondingly displaced when fully extended lengthwise.

To such a slotted bar 14 there are attached in FIG. 5 not the clamping elements themselves (because of their specific configuration) but rather the wedge-shaped elements 10, displaceable along arm 13. However, since the wedge-shaped elements 10 form a functional unit with each clamping element, and further determine the spacing between clamping elements by means of the wedge thickness, the displacement of the wedge-shaped elements by means of the slotted bar has the same effect, namely the telescoping and pushing together of the cassette. In FIG. 5, the cassette is pushed together. By movement of the slotted bar 14 in the direction of the arrow, the cassette is opened.

Figure 7:
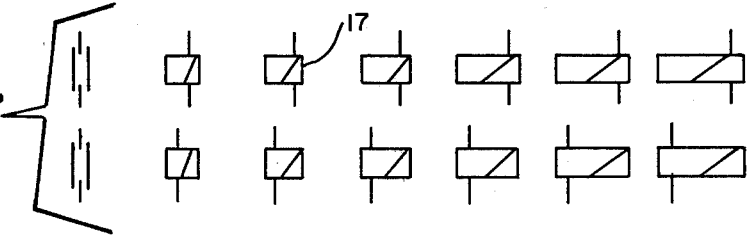

Another possible method for extending the cassette is provided in accordance with FIG. 7 by the use of one or more threaded shafts 17. These shafts may be of single- or multi-turn construction, the increase in the thread pitch from shaft to shaft being by a fixed amount. In this manner, the clamping elements are displaced synchronously in the extension direction in response to rotation of the common shaft axis. The clamping element which is closest to the fixed point of the cassette moves slowest, that which is farthest from the fixed point moves most rapidly, until the original spacing between elements has everywhere increased by the same amount of play X. If the pitch of the thread on each shaft increases by this amount X relative to the preceding one, then the complete cassette extension is reached with only one complete revolution of the common shaft axis. If the thread pitch increases less, then correspondingly more turns of each shaft are required.

Figure 8:
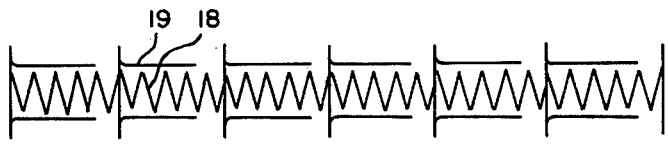
Figure 9:
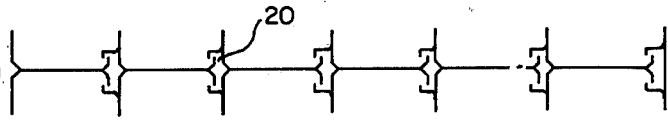

FIG. 8 shows still another possible way to carry out extension and contraction, i.e. opening or closing of the cassette, by means of helical springs 18. Tubular sleeves 19 of appropriate length prevent these helical springs from contracting to shorter lengths than the spacing amount between separating walls in the block casing. In FIG. 9, telescop-like elements 20 serve the same purpose. However, unlike with the helical springs, in this case precise limiting of the extension and sliding together of the cassette is provided by each individual element.

Figure 10:
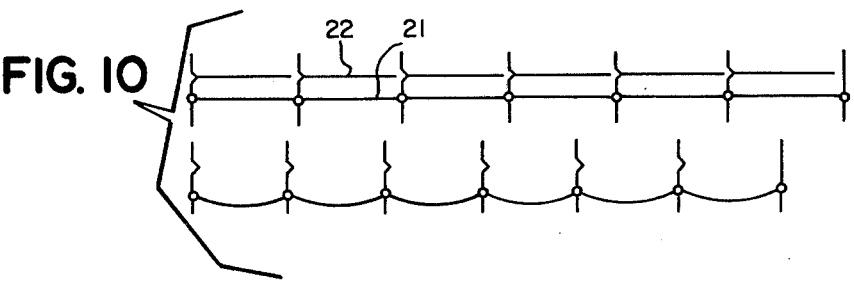

FIG. 10 shows an arrangement in which the clamping elements are attached to a pull string 21 at distances which, in each case, correspond to a separating distance between cells increased by X. In addition, spacing arms 22 can be attached to the clamping elements themselves in the extending direction. The opening of the cassette is then limited by the stretched tight pull string, is closing by the spacing arms which determine the cell separation.

If one compares the various possible extending elements according to FIGS. 5 to 10, it will be seen that the threaded shaft differs from all of the others in that it unites within itself all of the functions which are required by the extending mechanism, embodying the invention: it opens, closes and limits.

The helical spring according to FIG. 8 opens by virtue of its own tensile force but does not close. Also, its extension during opening is not specifically limited.

The slotted bar, the telescope-like elements, and the pull-string have in common that they are limiting in both directions but have no actuating drive either for opening or for closing. However, this drive may be conveniently provided by bi-directionally acting pneumatic cylinders. It is also possible to provide drive by combining a helical spring which works only in the opening direction with a simple pneumatic cylinder for closing.

A particularly desirable solution for the telescoping and its limiting is provided by the slotted bar 14 for the cassette according to the invention. Its functioning was previously explained with reference to FIG. 5. For better visibility, the drive element, namely a bi-directionally functioning pneumatic cylinder, was omitted from this illustration. In addition, a drive in accordance with the invention can also be provided by the combination of a simple pneumatic cylinder and a helical spring.

For the sake of the simplest possible mechanical realization of the cassette, it is advantageous that the drive elements for the displacement not be necessarily integrated with the cassette, but rather these may be positioned externally.

We claim:

1. Apparatus for receiving, positioning and holding a plurality of plate stacks for lead storage batteries during a stage of battery manufacture before the plate stacks are inserted into the block casing between the cell separating partitions of said casing, said apparatus comprising a cassette conforming to the plan dimensions of the block casing and having a series of consecutive clamping means spaced for insertion between adjacent plate stacks to temporarily take the place of the cell separating partitions of the block casing and to define a plurality of consecutive plate stack receptacles, means for displacing said series of clamping means in unison alternately in one direction or the other along a linear axis, said displacing means being so constructed and arranged as to displace consecutive ones of said series of clamping means by distances which are increasing multiples of an amount x in response to displacement in said one direction, and to return said clamping means to their respective predisplacement positions in response to displacement in said other direction, said displacing means displacing said consecutive ones of said series of clamping means so as to exert clamping pressure on said plate stack within consecutive plate stack receptacles, whereby the widths of all said plate stack receptacles are caused alternately to expand and contract in unison, and means for causing at least some of said clamping means to controllably exert pressure along said axis upon plate stacks within the contracted receptacles which pressure adds to that exerted by the operation of said displacing means.

2. The apparatus of claim 1 comprising
a support member with parallel extending guide arms along which the clamping means are displaceably positioned.

3. The apparatus of claim 1 wherein the clamping means are pneumatically actuatable.

4. The apparatus of claim 1 wherein the displacing means for the clamping means takes the form of a slotted bar and a drive means, different slots of said bar being in displacing engagement with different ones of said clamping means and progressively varying in length by said amount x.

5. The apparatus of claim 4 wherein the drive means includes a bi-directionally acting pneumatic cylinder.

6. The apparatus of claim 4 wherein the drive means includes the combination of a simple pneumatic cylinder and a helical spring.

7. The apparatus of claim 1 wherein the displacing means for the clamping means includes one or more threaded shafts having an increasing pitch in the thread in the direction of extension and having one or more thread turns.

8. Apparatus for receiving, positioning and holding a plurality of plate stacks for lead storage batteries during a stage of battery manufacture before the plate stacks are inserted into the block casing between the cell separating partitions of said casing, said apparatus comprising a cassette conforming to the plan dimensions of the block casing and having a series of consecutive clamping means spaced for insertion between adjacent plate stacks to temporarily take the place of the cell separating partitions of the block casing and to define a plurality of consecutive plate stack receptacles, means for displacing said series of clamping means in unison alternately in one direction or the other along a linear axis, said displacing means being so constructed and arranged as to displace consecutive ones of said series of clamping means by distances which are increasing multiples of an amount x in response to displacement in said one direction, and to return said clamping means to their respective predisplacement positions in response to displacement in said other direction, said displacing means displacing said consecutive ones of said series of clamping means so as to exert clamping pressure on said plate stack within consecutive plate stack receptacles, whereby the widths of all said plate stack receptacles are caused alternately to expand and contract in unison, and means for causing at least some of said clamping means to controllably exert pressure along said axis upon plate stacks within the contracted receptacles which pressure adds to that exerted by the operation of said displacing means, said last-named means comprising two closely adjacent, pre-bent leaf springs for each of said last named clamping means, and reciprocably moveable wedge-shaped elements for alternately unbending and releasing said pre-bent leaf springs.

* * * * *